(12) United States Patent
Yang et al.

(10) Patent No.: US 9,170,691 B2
(45) Date of Patent: Oct. 27, 2015

(54) CAPACITIVE IN CELL TOUCH PANEL AND DRIVING METHOD THEREOF, DISPLAY DEVICE

(71) Applicant: BEIJING BOE OPTOELECTRONICS TECHNOLOGY CO., LTD., Beijing (CN)

(72) Inventors: Shengji Yang, Beijing (CN); Xue Dong, Beijing (CN); Cheng Li, Beijing (CN); Haisheng Wang, Beijing (CN); Weijie Zhao, Beijing (CN); Yingming Liu, Beijing (CN); Tao Ren, Beijing (CN); Xiaoliang Ding, Beijing (CN); Hongjuan Liu, Beijing (CN)

(73) Assignee: Beijing BOE Optoelectronics Technology Co., Ltd., Beijing (CN)

( * ) Notice: Subject to any disclaimer, the term of this patent is extended or adjusted under 35 U.S.C. 154(b) by 140 days.

(21) Appl. No.: 14/057,413

(22) Filed: Oct. 18, 2013

(65) Prior Publication Data

US 2014/0111473 A1    Apr. 24, 2014

(30) Foreign Application Priority Data

Oct. 19, 2012   (CN) .......................... 2012 1 0401458

(51) Int. Cl.
*G06F 3/044*   (2006.01)
*G06F 3/041*   (2006.01)
*G09G 3/36*    (2006.01)

(52) U.S. Cl.
CPC ................ *G06F 3/044* (2013.01); *G06F 3/041* (2013.01); *G09G 3/36* (2013.01)

(58) Field of Classification Search
CPC ................ G06F 3/0412; G06F 3/044; G09G 2300/0465; G09G 2300/0469; G09G 2300/0478; G09G 2300/0876; G02F 1/13338; H01L 27/323
See application file for complete search history.

(56) References Cited

U.S. PATENT DOCUMENTS 7,679,596 B2 *   3/2010   Kim et al. ........................ 345/98
8,451,244 B2 *   5/2013   Hotelling et al. ............. 345/173
(Continued)

FOREIGN PATENT DOCUMENTS

| CN | 102314284 A | 1/2012 |
| CN | 102402330 A | 4/2012 |
| CN | 102736788 A | 10/2012 |

OTHER PUBLICATIONS

First Office Action (Chinese language) issued by the Chinese Patent Office for Chinese Patent Application No. 201210401458.9 dated Dec. 17, 2014 , 8 pgs.
English translation of First Office Action issued by the Chinese Patent Office for Chinese Patent Application No. 201210401458.9 dated Dec. 17, 2014 , 8 pgs.

(Continued)

*Primary Examiner* — Gregory J Tryder
*Assistant Examiner* — Scott Trandai

(57) ABSTRACT

Embodiments of the present invention disclose a capacitive in-cell touch panel, a driving method thereof and a display device. Touch sensing electrodes extended along the row direction of pixel units are arranged on a color filter substrate; a thin-film transistor (TFT) array substrate adopts a dual gate structure, that is, two gate signal lines are disposed between every two adjacent rows of pixel units; every two adjacent columns of pixel units are taken as a group of pixel unit columns and share a data signal line disposed between the two pixel unit columns, so that the positions of a part of data signal lines can be saved; and touch driving electrodes for achieving the touch function are arranged at the saved positions of the data signal lines.

12 Claims, 7 Drawing Sheets

(56) References Cited

U.S. PATENT DOCUMENTS

| | | | |
|---|---|---|---|
| 8,786,571 B2* | 7/2014 | Koito et al. | 345/174 |
| 2007/0262943 A1* | 11/2007 | Kang | 345/98 |
| 2009/0314551 A1* | 12/2009 | Nakajima | 178/18.05 |
| 2011/0267293 A1* | 11/2011 | Noguchi et al. | 345/173 |
| 2011/0316809 A1* | 12/2011 | Kim et al. | 345/174 |
| 2012/0056835 A1 | 3/2012 | Choo et al. | |
| 2012/0218482 A1* | 8/2012 | Hwang et al. | 349/12 |
| 2012/0262389 A1 | 10/2012 | Kida et al. | |
| 2012/0313881 A1* | 12/2012 | Ge et al. | 345/174 |

OTHER PUBLICATIONS

Second Office Action (Chinese language) issued by the Chinese Patent Office for Chinese Patent Application No. 201210401458.9 dated Feb. 13, 2015, 7 pgs.

English translation of Second Office Action issued by the Chinese Patent Office for Chinese Patent Application No. 201210401458.9 dated Feb. 13, 2015, 9 pgs.

English Abstract of CN102736788A, listed above; 1 page.

English Abstract of CN102314284A, listed above; 1 page.

English Abstract of CN102402330A, listed above; 1 page.

\* cited by examiner

CAPACITIVE IN CELL TOUCH PANEL AND DRIVING METHOD THEREOF, DISPLAY DEVICE

CROSS REFERENCE TO RELATED APPLICATIONS

This application claims priority from Chinese National Application No. 201210401458.9 filed on Oct. 19, 2012, the contents of which are incorporated herein by reference.

BACKGROUND

Embodiments of the present invention relate to a capacitive in-cell touch panel, a driving method thereof and a display device.

With the rapid development of the display technology, touch screen panels have been gradually widespread in people's lives. Currently, the touch screen panels, based on the structure, can be divided into add-on mode touch panels, on-cell touch panels and in-cell touch panels. The add-on touch panel is to separately produce a touch screen and a liquid crystal display (LCD) which are then bonded together to form an LCD with touch function, and has the disadvantages of high production cost, low light transmittance, thick module and the like. The in-cell touch panel is to embed touch electrodes of a touch screen into an LCD, so that not only the overall thickness of a module can be reduced but also the production cost of the touch panel can be greatly reduced. Therefore, the in-cell touch panels are favored for the major panel manufacturers.

In order to maximize the aperture ratio of a touch display screen, a pixel structure in a thin-film transistor (TFT) array substrate of the touch screen may adopt a dual gate structure when designed. As illustrated in FIG. 1, two gate signal lines are disposed between every two adjacent rows of pixel units on the TFT array substrate, for instance, Gate 1 and Gate 2, Gate 3 and Gate 4, or Gate 5 and Gate 6; and every two adjacent columns of pixel units are taken as a group of pixel unit columns and share a data signal line Data 1, Data 2 or Data 3 disposed between the two pixel unit columns. The dual gate structure reduces the number of data signal lines and source driver ICs by doubling the number of the gate signal lines, and hence reduces the overall cost of the display. But there is no capacitive in-cell touch panel based on the dual gate structure currently.

SUMMARY

One embodiment of the present invention provides a capacitive in-cell touch panel, comprising: a color filter substrate, a thin-film transistor (TFT) array substrate and a liquid crystal layer disposed between the color filter substrate and the TFT array substrate, wherein the capacitive in-cell touch panel is formed with a plurality of pixel units arranged in a matrix; two gate signal lines are disposed between every two adjacent rows of pixel units in the TFT array substrate, every two adjacent columns of pixel units being are taken as a group of pixel unit columns, and a data signal line is disposed between the two pixel unit columns in each group of pixel unit columns and shared by the two pixel unit columns; the TFT array substrate includes a plurality of touch driving electrodes disposed at gaps between adjacent groups of pixel unit columns; and the color filter substrate includes a plurality of touch sensing electrodes extended along a row direction of the pixel units.

Another embodiment of the present invention provides a display device comprising the foregoing capacitive in-cell touch panel.

Still another embodiment of the present invention provides a method for driving the capacitive in-cell touch panel according to claim 1, comprising the following steps of: dividing each display frame of the touch panel into a display time period and a touch time period; in the display time period, applying a gate scanning signal to each gate signal line in the touch panel in sequence, applying gray-scale signals to the data signal lines to control rotation of liquid crystal molecules, and meanwhile, applying low level signals to the touch driving electrodes and the touch sensing electrodes; and in the touch time period, applying touch scanning signals to the touch driving electrodes so that the touch sensing electrodes couple and output voltage signals of the touch scanning signals, and meanwhile, each gate signal line and each data signal line in the touch panel having no signal input.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Currently, in-plane switch (IPS) technology and advanced super dimension switch (ADS) technology are the main LCD technology capable of achieving wide viewing angle. The ADS technology is to form a multidimensional electric field by electric fields produced on the edges of slit electrodes on the same plane and electric fields produced between a slit electrode layer and a plate electrode layer, so that liquid crystal molecules in all directions, between the slit electrodes in a liquid crystal cell and over the electrodes, can rotate, and thus the working efficiency of liquid crystals and the light transmittance can be improved. Moreover, the ADS technology can improve the picture quality of thin-film transistor liquid crystal display (TFT-LCD) products and has the advantages of high resolution, high transmittance, low power consumption, wide viewing angle, high aperture ratio, low color difference, no push Mura and the like. High aperture ratio advanced super dimension switch (H-ADS) is an important implementation of the ADS technology.

The embodiment of the present invention provides a novel capacitive in-cell touch panel structure based on the ADS technology and the H-ADS technology. Detailed description will be given below to a capacitive in-cell touch panel, a driving method thereof and a display device, provided by the embodiments of the present invention, with reference to the accompanying drawings. However, it should be noted that the capacitive in-cell touch panel structure of the embodiment of the present invention is not limited to the ADS technology and the H-ADS technology, may also be applied to other LCD structures adopting the IPS technology and the like, and may also be applied to other types of display structures such as organic light-emitting displays (OLED).

The thickness and the shape of various layers of films in the accompanying drawings do not reflect the real scale of a TFT array substrate or a color filter substrate and are only intended to illustrate the contents of the present invention.

Figure 1:
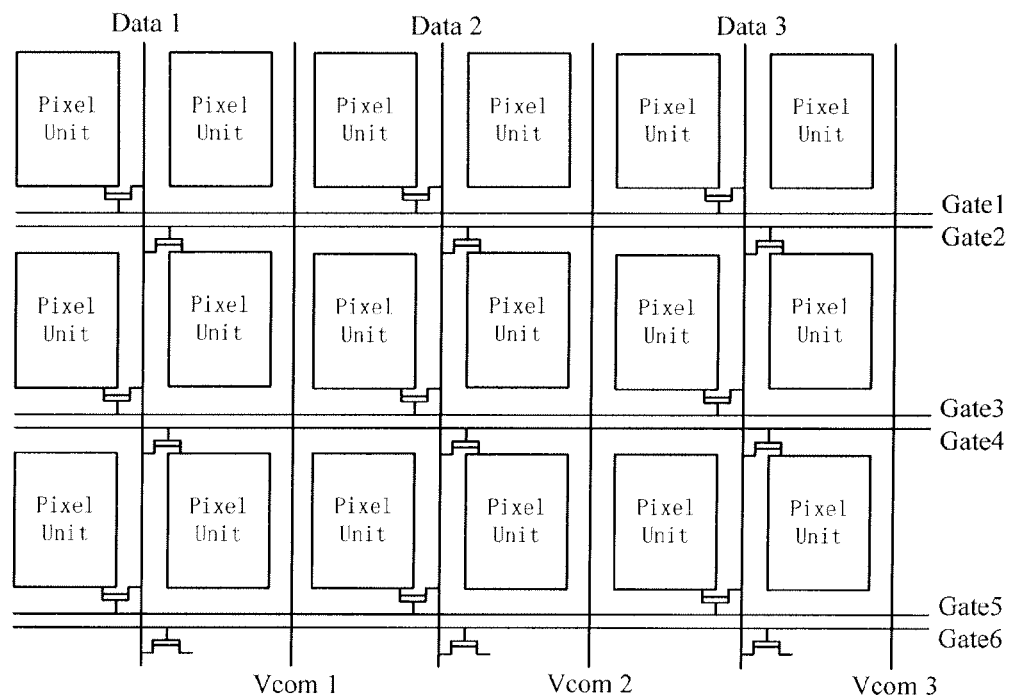
FIG. 1 is a schematic structural view of a dual gate structure of a conventional display panel.
Figure 2:
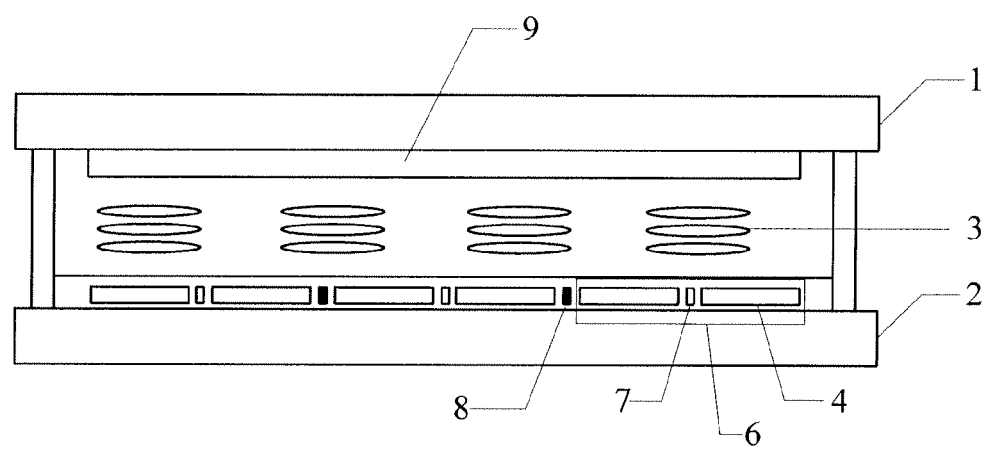
FIG. 2 is a longitudinal sectional view of a capacitive in-cell touch panel provided by the embodiment of the present invention.
Figure 3:
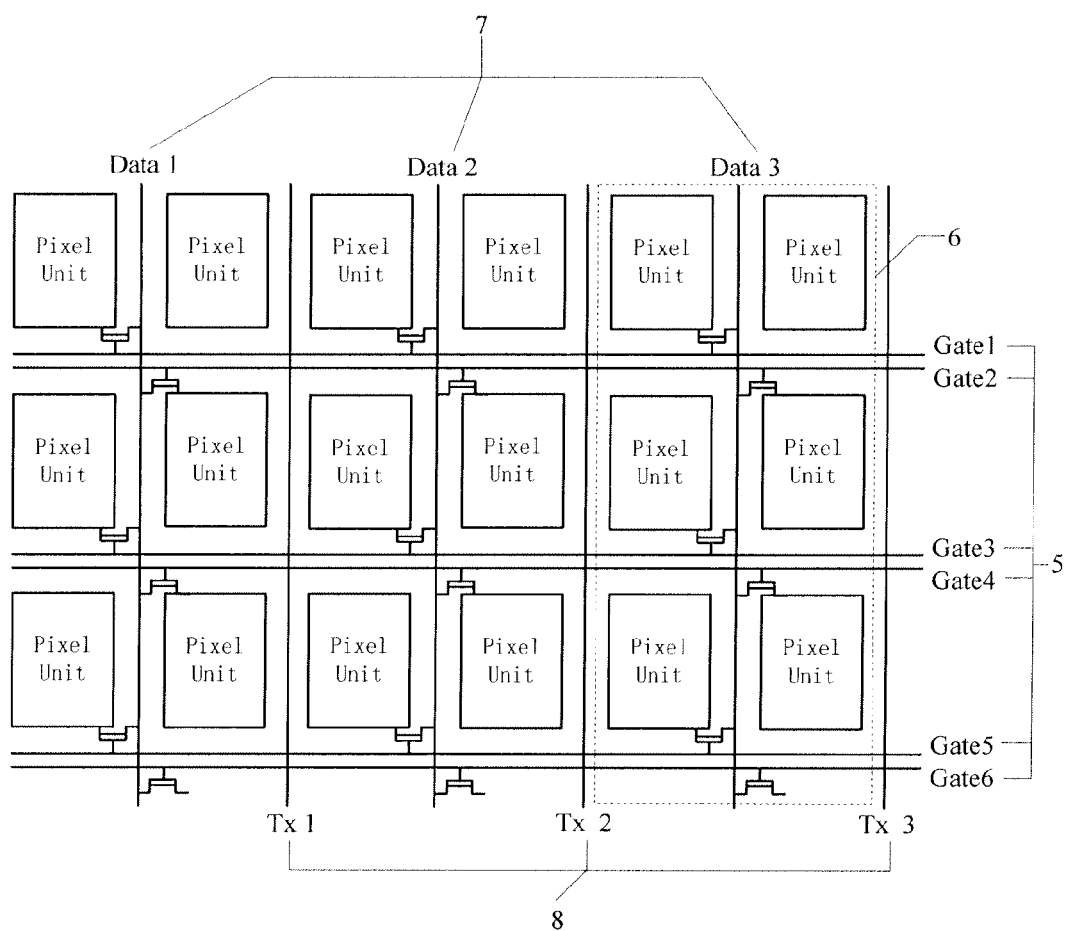
FIG. 3 is a top view of a TFT array substrate in the capacitive in-cell touch panel provided by the embodiment of the present invention.

FIGS. 2 and 3 are respectively a longitudinal sectional view of the capacitive in-cell touch panel provided by the embodiment of the present invention and a top view of the TFT array substrate in the touch panel. As illustrated in FIGS. 2 and 3, the capacitive in-cell touch panel provided by the embodiment of the present invention comprises a color filter substrate 1, a TFT array substrate 2 and a liquid crystal layer 3 disposed between the color filter substrate 1 and the TFT array substrate 2. A plurality of pixel units 4 arranged in a matrix are formed in the capacitive in-cell touch panel. For instance, the plurality of the pixel units 4 include a plurality of pixel rows and a plurality of pixel columns. Moreover, two gate signal lines 5 are disposed between every two adjacent rows of pixel units 4 in the TFT array substrate; and every two adjacent columns of pixel units 4 are taken as a group of pixel unit columns 6 and share a data signal line 7 disposed between the two pixel unit columns 4.

The TFT array substrate 2 includes at least one touch driving electrode 8, and various touch driving electrodes 8 are disposed at gaps between adjacent pixel unit columns 4. For instance, the touch driving electrodes 8 are extended along the column direction.

The color filter substrate 1 includes at least one touch sensing electrode 9, and various touch sensing electrodes 9 are extended along the row direction of the pixel units 4.

The touch panel provided by the embodiment of the present invention adopts a dual gate structure and hence saves the positions of a part of data signal lines (i.e., the data signal lines will not occupy these positions) by doubling the number of the gate signal lines. Moreover, as the accuracy of the touch panel is usually at the millimeter level but the accuracy of an LCD is usually at the micrometer level, it can be seen that the display accuracy is much greater than the touch accuracy. Therefore, the touch driving electrodes for achieving the touch function may be arranged at the saved position of the data signal lines, that is, arranged at the gaps between the adjacent pixel unit columns, and thus not only the touch accuracy can be guaranteed but also not too many opening areas of the pixel units can be occupied and hence large aperture ratio of the touch panel can be guaranteed.

Moreover, the touch panel provided by the embodiment of the present invention is also applicable to twisted nematic (TN) mode. More specifically, a part of common electrode lines may serve as the touch driving electrode on a TN mode TFT array substrate based on the dual gate structure; and strip ITO common electrodes may serve as the touch sensing electrodes on the color filter substrate. As for other structures of the TN mode touch panel, various structures adopting the conventional TN technology can be used, which will not be further described herein.

Furthermore, in order to reduce the mutual interference between display signals and touch signals of the touch panel, the touch and display time-sharing drive mode can be adopted in specific implementation, so that the interaction between display and touch in the working process can be avoided as much as possible.

Figure 4:
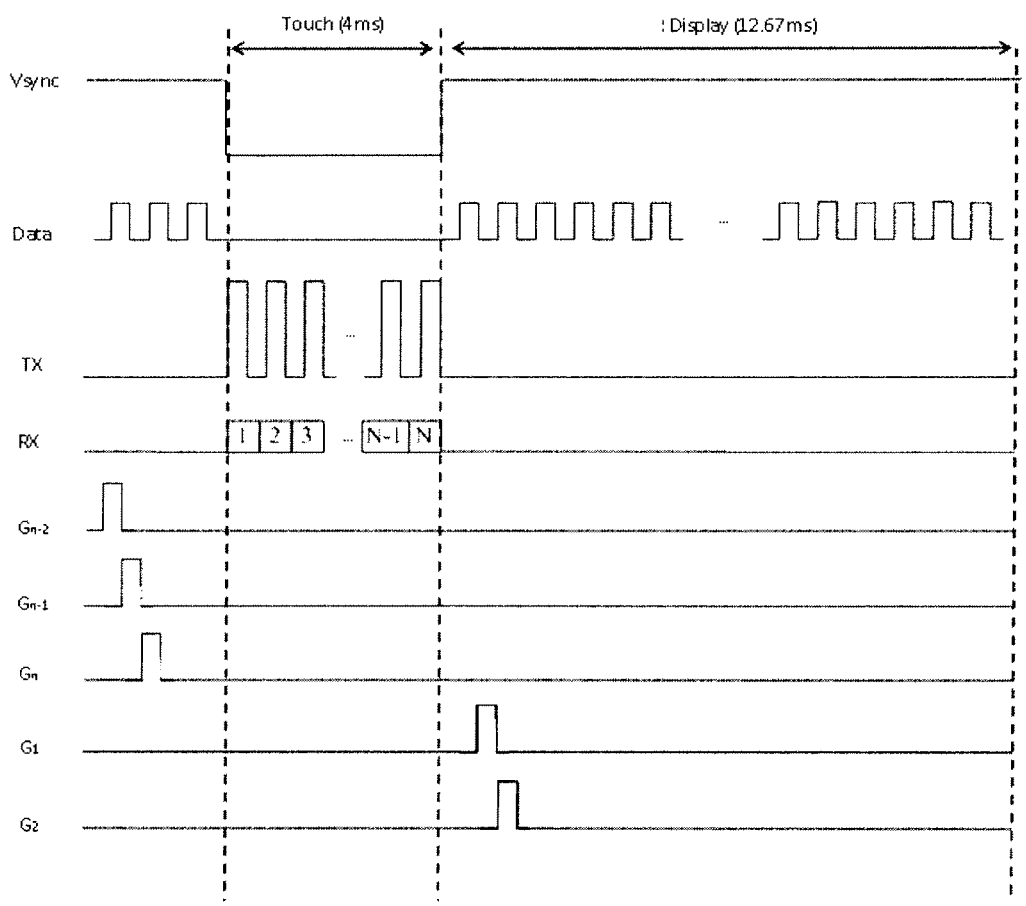
FIG. 4 is a working sequential chart of the capacitive in-cell touch panel provided by the embodiment of the present invention.

For instance, as illustrated in the sequential chart of FIG. 4, a method for driving the capacitive in-cell touch panel, provided by the embodiment of the present invention, comprises the following steps of:

Firstly, dividing each display frame (Vsync) of the touch panel into a display time period (Display) and a touch time period (Touch). For instance, as illustrated in the driving sequential chart of FIG. 4, the time for each display frame of the touch panel is 16.67 ms; 4 ms is selected therefrom as the Touch; and the remaining 12.67 ms is taken as the Display. Of course, the duration of both the Display and the Touch may be also properly adjusted according to the processing capability of an IC chip and will not be specifically limited herein.

In the display time period, applying low level signals to the touch driving electrodes Tx and the touch sensing electrodes Rx, and meanwhile, applying a gate scanning signal to each gate signal line G1, G2 . . . Gn in the touch panel in sequence and applying gray-scale signals to the data signal line Data to control the rotation of liquid crystal molecules. The working principle in this period of time is the same with the normal working principle of an LCD panel.

In the touch time period, applying touch scanning signals to the touch driving electrodes Tx so that the touch sensing electrodes Rx couple and output voltage signals of the touch scanning signals. The inductance capacitance between two electrodes at a touch point can be changed by finger touch, so that the voltage signals received by terminals of the touch sensing electrodes Rx can be changed, and thus the touch function can be achieved. In the touch time period, each gate signal line and each data signal line in the touch panel have no signal input.

Detailed description will be given below to the structure of the touch driving electrode in the TFT array substrate in the touch panel.

In an example, the touch driving electrodes may be arranged on the same layer with the data signal lines in the TFT array substrate, so that no additional manufacturing process is required in the process of manufacturing the TFT array substrate, and patterns of the data signal lines and the touch driving electrodes can be formed by only one patterning process, and thus the manufacturing cost can be saved and the added value of products can be improved.

For instance, as the touch driving electrodes are arranged between adjacent pixel unit columns and the gaps between the pixel units are generally about 5 micrometers, the width of various touch driving electrodes is very small, and hence the overlapping surface area between the touch driving electrodes and the touch sensing electrodes can be very small and the coupling capacitance produced can be very low as well. In order to guarantee that the coupling capacitance at nodes, i.e. overlapped positions, between the touch driving electrodes and the touch sensing electrodes reaches a required value (about 3 pF in general), the overlapping surface area at the overlapped positions between the touch driving electrodes and the touch sensing electrodes can be increased.

Figure 5:
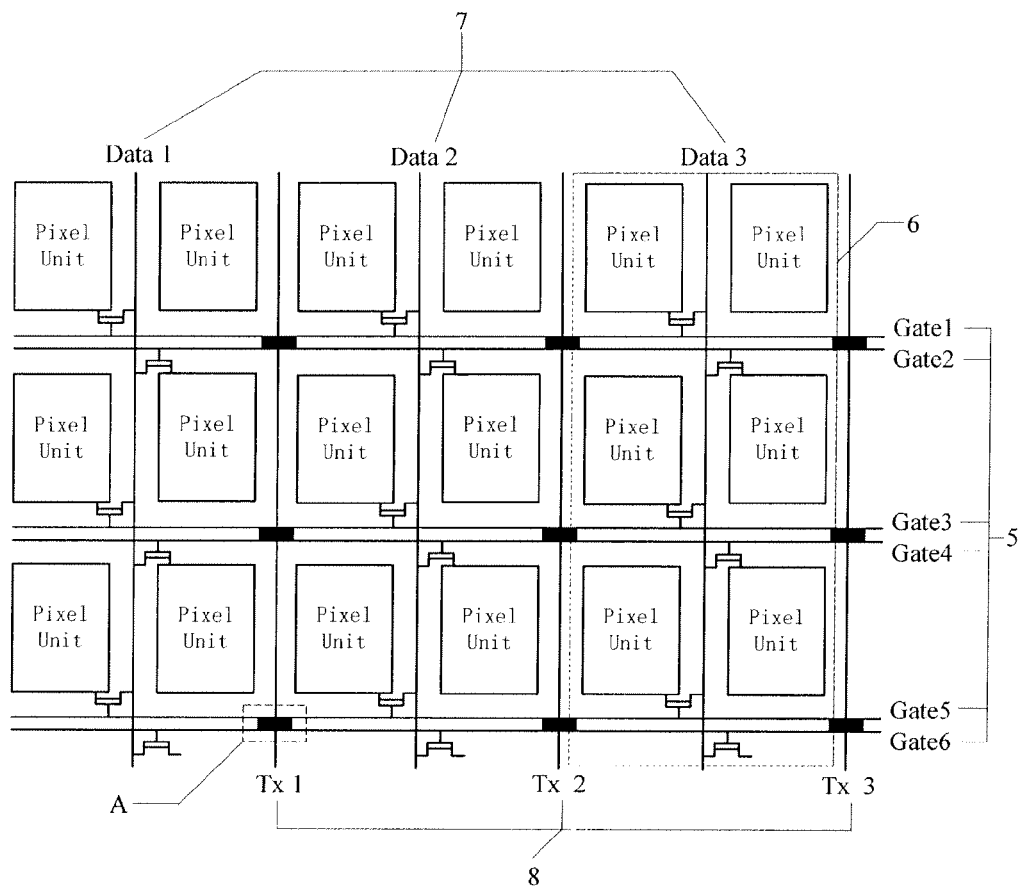
FIG. 5 is another top view of the TFT array substrate in the capacitive in-cell touch panel provided by the embodiment of the present invention.

For example, two modes may be adopted. The first mode is that: as illustrated in FIG. 5, a protruding structure A may be arranged at the position at which each touch driving electrode is overlapped with the two gate signal lines between the adjacent rows of pixel units. The shape of the protruding structure A may be rectangular as illustrated in FIG. 5 and may also adopt other common shapes and will not be limited herein. For instance, the protruding structures A may be extended along the row direction of the pixel units and disposed in the gaps between the adjacent pixel units. As the protruding structures A of the touch driving electrodes are arranged at the positions at which the touch driving electrodes are overlapped with the gate signal lines and will not occupy the opening areas of the pixel units, the aperture ratio of the touch panel cannot be affected. Moreover, as the time-sharing driving is adopted for the touching and the displaying, signals transmitted by the touch driving electrodes cannot affect the normal display of the display. Therefore, the overlapping surface area between the touch driving electrodes and the touch sensing electrodes may be increased via the protruding structures A of the touch driving electrodes, and thus the required coupling capacitance produced between the touch driving electrodes and the touch sensing electrodes can be guaranteed.

The second mode of increasing the overlapping surface area between the touch driving electrodes and the touch sensing electrodes is that: at least one touch point electrode is arranged on the same layer with the transparent common electrodes (for instance, indium tin oxide (ITO) common electrodes) in the TFT array substrate; various touch point electrodes are disposed at the positions at which various touch driving electrodes are overlapped with the two gate signal lines between the adjacent rows of pixel units and electrically connected with the overlapped touch driving electrodes via through holes. That is to say, the additionally arranged touch point electrodes and the common electrodes are formed by one patterning process. Therefore, the additionally arranged touch point electrodes and the common electrodes are made of same materials which are generally transparent conductive oxide materials such as ITO or indium zinc oxide (IZO). The shape of the touch point electrodes may be similar to that of the protruding structures A as illustrated in FIG. 5, and the area of both may be equivalent. Therefore, the touch point electrodes will not be illustrated herein.

It can be seen that the additionally arranged touch point electrodes in the second mode and the protruding structures of the touch driving electrodes in the first mode are arranged at the same area in the top view of the TFT array substrate, that is, arranged at the positions at which the touch driving electrodes are overlapped with the gate signal lines, but the touch point electrodes and the protruding structures are arranged on different film layers. Therefore, the second mode will not occupy the opening areas of the pixel units and affect the aperture ratio of the touch panel, either. Moreover, the overlapping surface area between the touch driving electrodes and the touch sensing electrodes can be increased through the touch point electrodes electrically connected with the touch driving electrodes, and thus the required coupling capacitance produced between the touch driving electrodes and the touch sensing electrodes can be guaranteed.

In general, on an array substrate of an ADS mode LCD panel, common electrodes are taken as plate electrodes and disposed on the lower layer (closer to the substrate); pixel electrodes are taken as slit electrodes and disposed on the upper layer (closer to a liquid crystal layer); and an insulating layer is disposed between the pixel electrodes and the common electrodes. But on an array substrate of an HADS mode LCD panel, pixel electrodes are taken as plate electrodes and disposed on the lower layer (closer to the substrate); common electrodes are taken as slit electrodes and disposed on the upper layer (closer to a liquid crystal layer); and an insulating layer is disposed between the pixel electrodes and the common electrodes.

Figure 6:
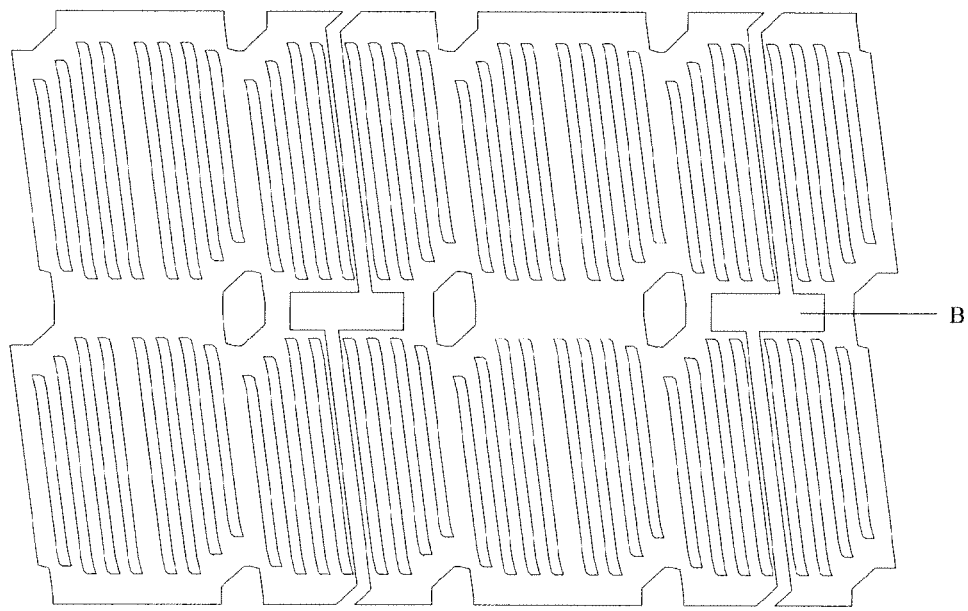
FIG. 6 is a top view of a common electrode pattern in the capacitive in-cell touch panel provided by the embodiment of the present invention.

On the array substrate of the HADS mode LCD panel, the touch driving electrodes will be shielded by the common electrodes closer to the liquid crystal layer as being arranged on the same layer with data signal lines, which is unfavorable for touch sensing electrodes arranged on a color filter substrate to detect touch scanning signals. For instance, based on the mode of the LCD panel actually applied by the foregoing touch panel, in the case of an HADS mode touch panel, common electrodes in a TFT array substrate are disposed over pixel electrodes. As illustrated in FIG. 6 which illustrates a common electrode pattern, ITO common electrodes are provided with hollowed-out structures at positions corresponding to the touch driving electrodes, that is, the ITO common electrodes are provided so that there is no common electrode pattern at the positions corresponding to the touch driving electrodes, as illustrated by a B area in FIG. 6, so that guarantee can be made that the touch scanning signals applied to the touch driving electrodes can be more easily detected by the touch sensing electrodes.

Figure 7:
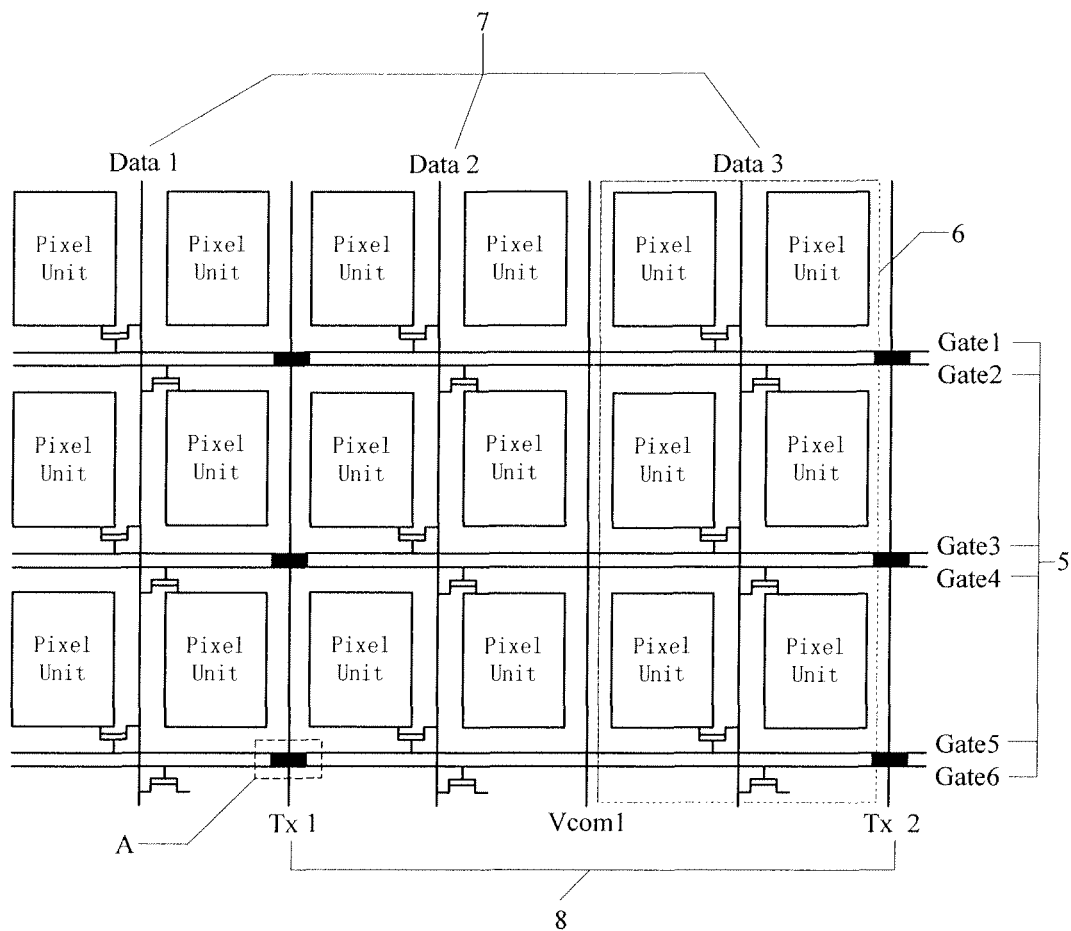
FIG. 7 is another top view of the TFT array substrate in the capacitive in-cell touch panel provided by the embodiment of the present invention.

Furthermore, as the accuracy of the touch panel is usually at the millimeter level but the accuracy of the LCD is usually at the micrometer level, the display accuracy is far greater than the touch accuracy. Therefore, the touch driving electrodes for achieving the touch function may not occupy the gaps between all the adjacent pixel units, and thus at least one common electrode line Vcom electrically connected with the common electrodes in the TFT array substrate may be disposed at gaps between adjacent groups of pixel unit columns except for those provided with the touch driving electrodes, as illustrated in FIG. 7, and consequently the stability of common electrode signals carried by the common electrodes can be improved.

Detailed description will be given below to the specific structure of the touch sensing electrode in the color filter substrate of the touch panel.

In an example, the touch sensing electrodes may be disposed between a base and color resins of the color filter substrate, or on a surface of the color filter substrate facing the liquid crystal layer, or on a surface of the color filter substrate facing away from the liquid crystal layer.

In an example, a shielding ITO electrode on the color filter substrate may be divided into the touch sensing electrodes with appropriate width according to the required touch accuracy. In general, the width of each touch sensing electrode is preferably between 2 and 6 mm. Moreover, as the accuracy of the touch panel is usually at the millimeter level but the accuracy of the LCD is usually at the micrometer level, it can be seen that the display accuracy is far greater than the touch accuracy. Therefore, in general, each touch sensing electrode will correspond to a plurality of rows of pixel units.

Figure 8:
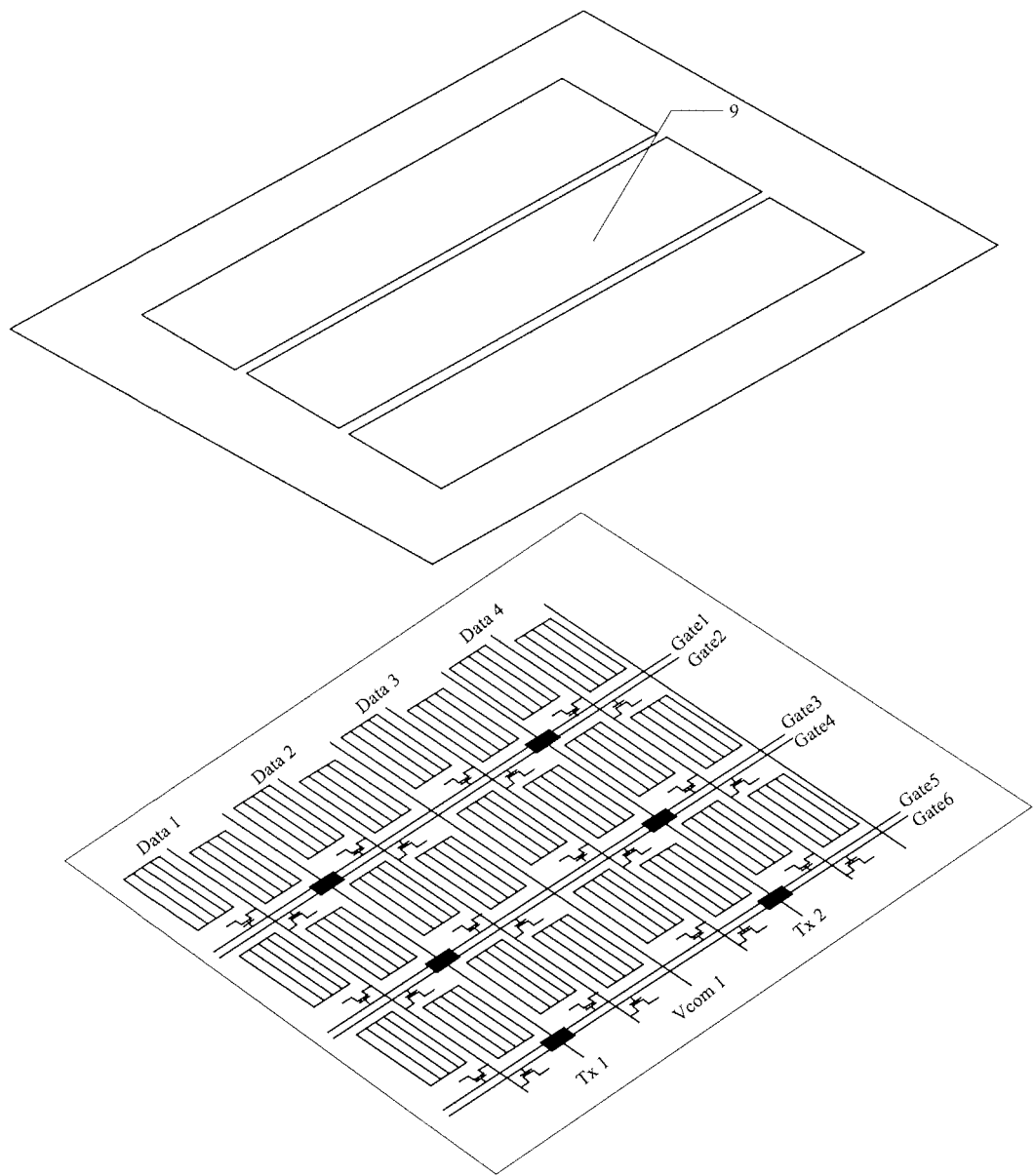
FIG. 8 is an exploded view of a structure of the capacitive in-cell touch panel provided by the embodiment of the present invention, obtained after the cell assembly of a color filter substrate and the TFT array substrate.

When the touch sensing electrodes are disposed on the surface of the color filter substrate facing away from the liquid crystal layer, as the spacing between the touch sensing electrodes and the touch driving electrodes is very large, guarantee can be made that the coupling capacitance falls in an appropriate range by directly manufacturing various touch sensing electrodes 9 into planar structures, as illustrated in FIG. 8.

Figure 9:
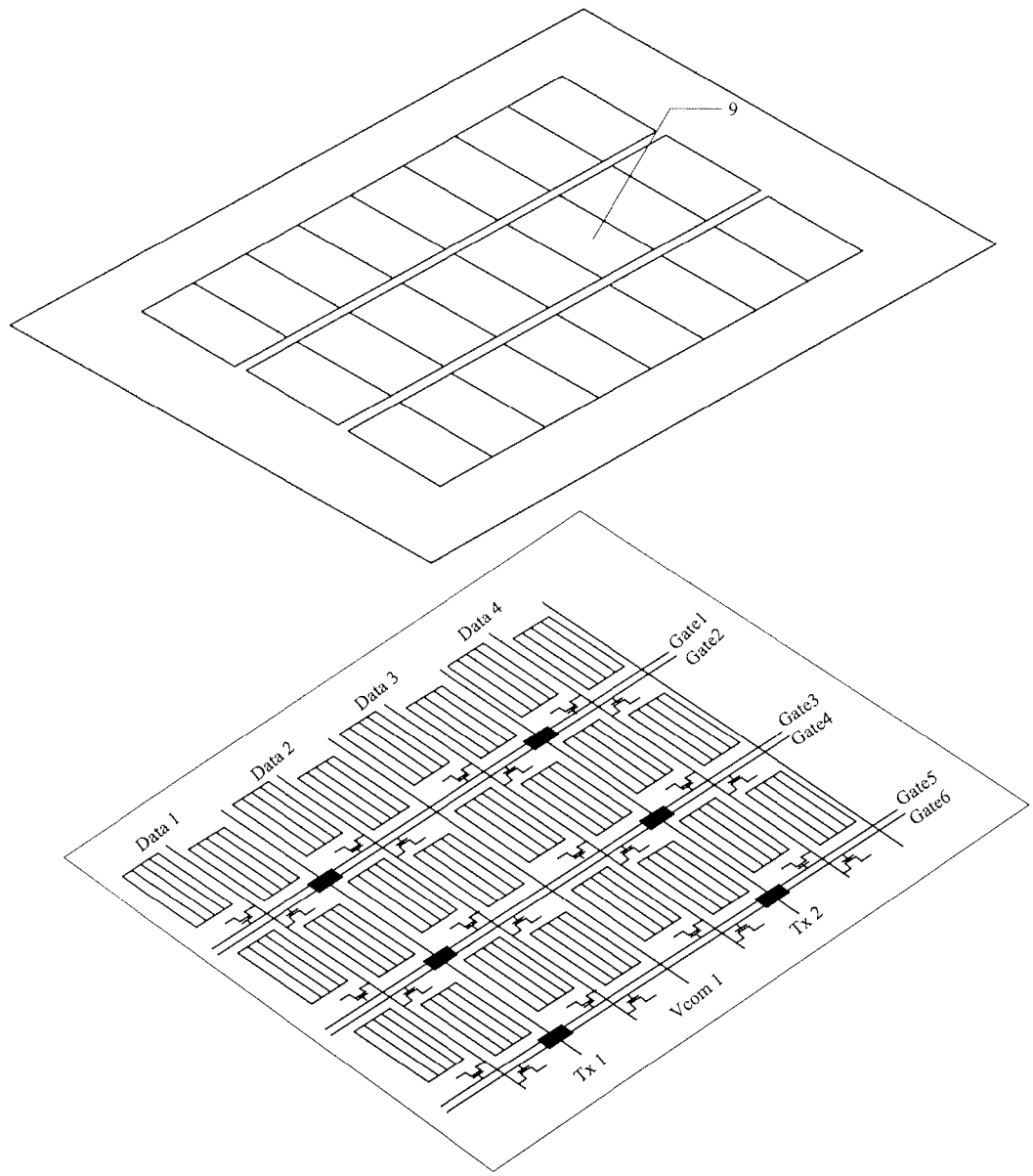
FIG. 9 is another exploded view of the structure of the capacitive in-cell touch panel provided by the embodiment of the present invention, obtained after the cell assembly of a color filter substrate and the TFT array substrate.

When the touch sensing electrodes are disposed on the surface of the color filter substrate facing the liquid crystal layer, as the spacing between the touch sensing electrodes and the touch driving electrodes is very small, in order to guarantee that the coupling capacitance falls in the appropriate range and improve the feasibility of touch, as illustrated in FIG. 9, various touch sensing electrodes 9 may be designed to have latticed electrode structures and the touch sensing electrodes with the latticed electrode structures are disposed in an area opposite to a black matrix of the color filter substrate. Therefore, a black matrix can be utilized to shield the latticed structures of the touch sensing electrodes, and thus the aperture ratio of the display will not be affected.

For example, as the touch sensing electrodes with the latticed structures on the color filter substrate will not shield the pixel units, the touch sensing electrodes may be specifically made of transparent conductive oxides such as ITO or IZO and may also be made of metals. When the touch sensing electrodes are made of the metals, the resistance of the touch sensing electrodes can be effectively reduced.

Moreover, when the touch driving electrodes and the touch sensing electrodes are arranged, in order to reduce the cost of the IC chip connected therewith, the number of drive channels configured to provide electrical signals for various touch driving electrodes can be reduced by connecting a plurality of adjacent touch driving electrodes at any end through leads, and the number of sensing channels connected with various touch sensing electrodes can be reduced by connecting a plurality of adjacent touch sensing electrodes at any end through leads. For instance, as for a touch panel with the resolution of 1280*800, touch driving electrodes contained in every 120 pixels may be connected with each other through leads and taken as a touch driving electrode, and touch sensing electrodes contained in every 100 pixels may be taken as a touch sensing electrode. Therefore, only 10 channel interfaces of the touch driving electrodes are required in total, and only 8 channel interfaces of the touch sensing electrodes are required in total, and consequently, the requirement on the IC chip can be reduced.

Based on the same invention concept, the embodiment of the present invention further provides a display device comprising the capacitive in-cell touch panel provided by the embodiment of the present invention. The implementation of the display device can refer to the embodiments of the capacitive in-cell touch panel and will not be further described.

In the capacitive in-cell touch panel, the driving method thereof and the display device, provided by the embodiments of the present invention, the touch sensing electrodes extended along the row direction of the pixel units are arranged on the color filter substrate; the TFT array substrate adopts the dual gate structure, that is, the two gate signal lines are disposed between the adjacent rows of pixel units, and every two adjacent columns of pixel units are taken as a group of pixel unit columns and share the data signal line disposed between the two pixel unit columns, so that the positions of a part of the data signal line can be saved by doubling the number of the gate signal lines. Moreover, as the accuracy of the touch panel is usually at the millimeter level but the accuracy of the LCD is usually at the micrometer level, it can be seen that the display accuracy is far greater than the touch accuracy. Therefore, the touch driving electrodes for achieving the touch function may be arranged at the saved positions of the data signal lines, namely arranged at the gaps between the adjacent pixel unit columns, and thus not only the touch accuracy can be guaranteed but also not too many opening areas of the pixel units can be occupied and hence large aperture ratio of the touch panel can be guaranteed.

The foregoing is merely exemplary embodiments of the invention, but is not used to limit the protection scope of the invention. The protection scope of the invention shall be defined by the attached claims.

What is claimed is:

1. A capacitive in-cell touch panel, comprising: a color filter substrate, a thin-film transistor (TFT) array substrate and a liquid crystal layer disposed between the color filter substrate and the TFT array substrate, wherein
    the capacitive in-cell touch panel is formed with a plurality of pixel units arranged in a matrix;
    two gate signal lines are disposed between every two adjacent rows of pixel units in the TFT array substrate, every two adjacent columns of pixel units being are taken as a group of pixel unit columns, and a data signal line is disposed between the two pixel unit columns in each group of pixel unit columns and shared by the two pixel unit columns;
    the TFT array substrate includes a plurality of touch driving electrodes disposed at gaps between adjacent groups of pixel unit columns;
    the color filter substrate includes a plurality of touch sensing electrodes extended along a row direction of the pixel units;
    each touch driving electrode and the data signal line in the TFT array substrate are arranged on a same layer;
    each touch driving electrode has a protruding structure at a position where the touch driving electrode is overlapped with the two gate signal lines between the adjacent rows of pixel units; and
    the protruding structure is extended along the row direction of the pixel units and disposed at gaps between adjacent pixel units.

2. The touch panel according to claim 1, wherein each pixel unit of the TFT array substrate includes a transparent common electrode and a transparent pixel electrode.

3. The touch panel according to claim 2, further comprising at least one touch point electrode which is arranged on a same layer with the transparent common electrode in the TFT array substrate; each touch point electrode being disposed at a position at which each touch driving electrode is overlapped with the two gate signal lines between the two adjacent rows of pixel units, and electrically connected with the overlapped touch driving electrode via a through hole.

4. The touch panel according to claim 2, wherein the common electrode is disposed over the pixel electrode and provided with a hollowed-out structure at a position corresponding to each touch driving electrode.

5. The touch panel according to claim 2, further comprising at least one common electrode line electrically connected with the common electrode in the TFT array substrate; and each common electrode line being disposed at gaps between adjacent groups of pixel unit columns except for those provided with the touch driving electrodes.

6. The touch panel according to claim 1, wherein the touch sensing electrodes are disposed between a base substrate and color resins of the color filter substrate, or on a surface of the color filter substrate facing the liquid crystal layer, or on a surface of the color filter substrate facing away from the liquid crystal layer.

7. The touch panel according to claim 6, wherein each touch sensing electrode corresponds to a plurality of rows of pixel units.

8. The touch panel according to claim 7, wherein the touch sensing electrodes have a latticed electrode structure; and the touch sensing electrodes with the latticed electrode structure are disposed in an area opposite to a black matrix of the color filter substrate.

9. The touch panel according to claim 8, wherein the touch sensing electrodes are made of metals or transparent conductive oxides.

10. The touch panel according to claim 1, wherein a plurality of adjacent touch sensing electrodes are connected to one another at any end through leads; and a plurality of adjacent touch driving electrodes are connected to one another at any end through leads.

11. A display device, comprising the capacitive in-cell touch panel according to claim 1.

12. A method for driving a capacitive in-cell touch panel comprising: a color filter substrate, a thin-film transistor (TFT) array substrate and a liquid crystal layer disposed between the color filter substrate and the TFT array substrate, wherein the capacitive in-cell touch panel is formed with a plurality of pixel units arranged in a matrix; two gate signal lines are disposed between every two adjacent rows of pixel units in the TFT array substrate, every two adjacent columns of pixel units being are taken as a group of pixel unit columns, and a data signal line is disposed between the two pixel unit columns in each group of pixel unit columns and shared by the two pixel unit columns; the TFT array substrate includes a plurality of touch driving electrodes disposed at gaps between adjacent groups of pixel unit columns; the color filter substrate includes a plurality of touch sensing electrodes extended along a row direction of the pixel units; each touch driving electrode has a protruding structure at a position where the touch driving electrode is overlapped with the two gate signal lines between the adjacent rows of pixel units; and the protruding structure is extended along the row direction of the pixel units and disposed at gaps between adjacent pixel units, the method comprising the following steps of:

dividing each display frame of the touch panel into a display time period and a touch time period;

in the display time period, applying a gate scanning signal to each gate signal line in the touch panel in sequence, applying gray-scale signals to the data signal lines to control rotation of liquid crystal molecules, and meanwhile, applying low level signals to the touch driving electrodes and the touch sensing electrodes; and in the touch time period, applying touch scanning signals to the touch driving electrodes so that the touch sensing electrodes couple and output voltage signals of the touch scanning signals, and meanwhile, each gate signal line and each data signal line in the touch panel having no signal input.

* * * * *